No. 754,783. PATENTED MAR. 15, 1904.
G. LIEBAU.
FIREPROOF CONSTRUCTION.
APPLICATION FILED NOV. 29, 1902.
NO MODEL.
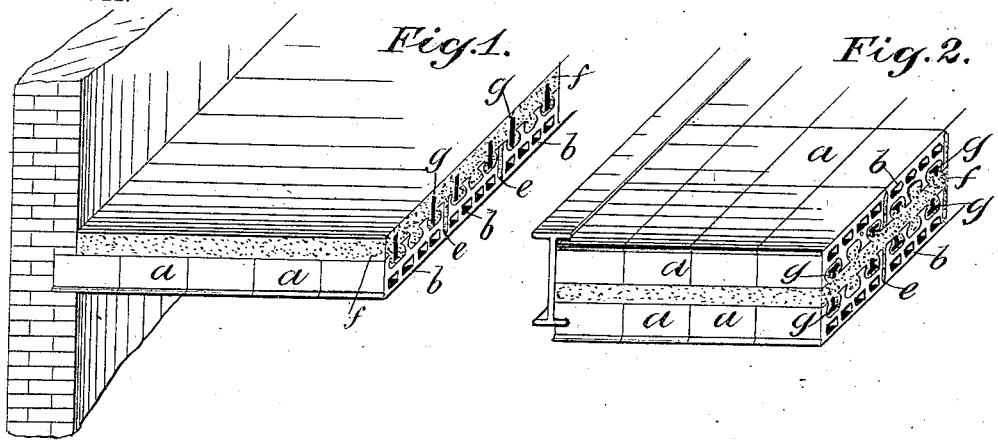
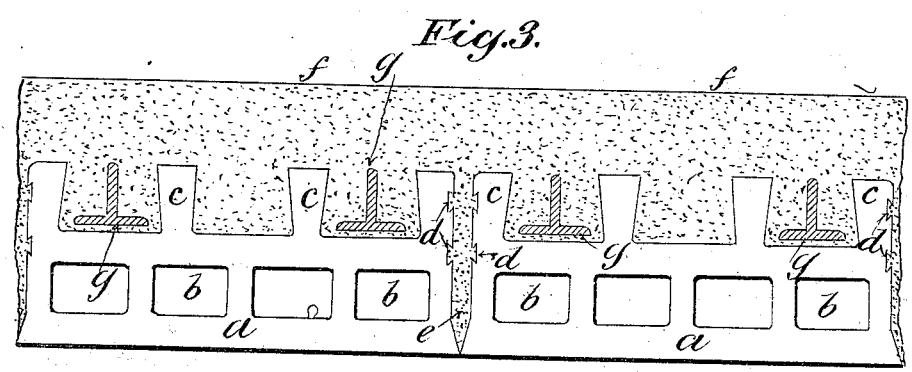
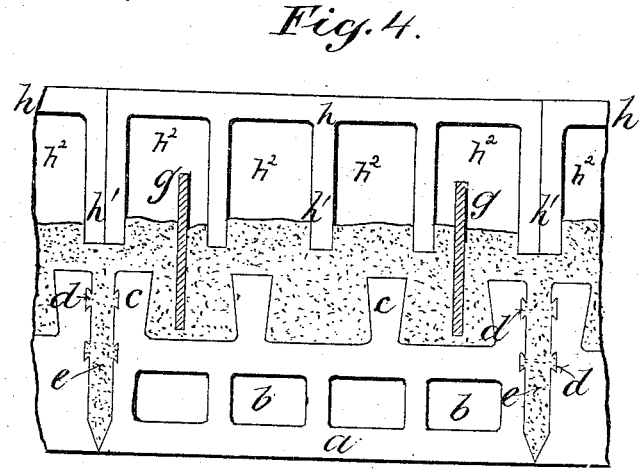
Witnesses:
O. W. Gardner
F. E. Roach
Inventor:
Gustav Liebau
by John Bradley Tanner
his Atty.

No. 754,783.  
Patented March 15, 1904.

UNITED STATES PATENT OFFICE.

GUSTAV LIEBAU, OF MAURER, NEW JERSEY

FIREPROOF CONSTRUCTION.

SPECIFICATION forming part of Letters Patent No. 754,783, dated March 15, 1904.

Application filed November 29, 1902. Serial No. 133,270. (No model.)

*To all whom it may concern:*

Be it known that I, GUSTAV LIEBAU, a citizen of the United States, and a resident of Maurer, in the county of Middlesex and State of New Jersey, have invented certain new and useful Improvements in Fireproof Construction, of which the following is a specification.

This invention relates to certain new and useful improvements in fireproof construction, and particularly to so-called "flat arches" constituting a floor and ceiling. As heretofore usually constructed these arches have been composed of courses of porous hollow brick or tiles or of a mass of concrete of slag and mortar or cement laid between the usual flooring I-beams. Of these constructions the former is the more efficacious, as the porous hollow tile formed of burned fire-clay is the only building material which is absolutely fireproof and not affected by intense heat, while the latter construction under sustained intense heat becomes friable and crumbles away, although it has the advantage of initial cheapness.

It is therefore the object of my invention to combine the cheapness of the concrete with the fireproof qualities of the hollow-tile construction and to produce flat arches which shall be about as cheap as those formed solely of concrete and at the same time be absolutely fireproof and possess great strength.

Referring to the accompanying drawings, in the several figures of which like parts are similarly designated, Figure 1 is a perspective view of one form of my invention in which only the bottom surface of the concrete is protected by the hollow tiles. Fig. 2 is a similar view of a different form of said invention in which the concrete is protected by upper and lower courses of hollow tiles. Fig. 3 is an enlarged end view of the construction shown in Fig. 1, and Fig. 4 is a similar view of a modification.

My construction may be used between the main or other walls of a building, as shown in Fig. 1, or between the usual flooring I-beams, as shown in Fig. 2, and by reason of the peculiar strength of my finished arch the span between said walls or I-beams may be of great and unusual width.

$a$ represents porous terra-cotta tiles having the usual longitudinal air-spaces $b$, of any desired shape and size, and provided on their upper surfaces with a series of longitudinal ribs $c$, preferably dovetailed in end view, as shown, for greater adherence with the concrete, and also preferably having on opposite sides the longitudinal dovetailed slots $d$ for the same purpose. The lateral lower edges of said tiles project beyond the sides thereof, so that conical spaces $e$ are formed between the courses, while the under side of the completed structure will present a smooth and unbroken surface, as clearly shown in the drawings.

$f$ is a mass of cement or mortar or, if preferred, of concrete composed of cement or mortar and slag, ashes, gravel, sand, or any other suitable material, filling the conical spaces $e$ between the courses of tiles and the spaces between the ribs $c$ thereof. I prefer to use mortar and coarse sand or analogous material, though obviously mortar may be used alone or with other substances, if preferred, without departing from my invention. Embedded in said concrete and preferably between said ribs $c$ are transverse metal strips $g$, which may consist of T-irons, I-rods, tubes or pipes, plain band-metal, angle or channel irons, U-bars, or be of any other desired shape and configuration. When band-iron is used, I prefer to embed it vertically in the concrete, as in Figs. 1 and 4, and when angle-irons are used they are preferably embedded with the apex down for the lower course. I have found in practice, however, that the T-iron strips are most efficacious in use and produce the greatest strength.

For comparatively short spans and when great strength is not required the band metal may be employed on account of its cheapness and the ease with which it may be embedded in the concrete. This construction is illustrated in Fig. 1, and it will be understood that the mass $f$ may be built up to the required height and the usual flooring-strips or tiling may be laid on its upper surface.

Where higher fireproof qualities are desired, a course of ordinary bricks or other refractory material may be laid on top of the concrete to protect the same from direct action of the heat in case of fire; but for this purpose I prefer to employ the fire-clay tiles shown in Fig. 4. These tiles consist of a base $h$, having the depending longitudinal ribs $h'$, which are of a height commensurate with the desired thickness of the completed arch and which may be forced into the concrete $f$, producing an even and level upper surface for the flooring and protecting the upper surface of the mass against direct action of heat, the dead-air spaces $h^2$, formed between the top of the concrete and the bottom of the base $h$, constituting an additional element of insulation.

For spans of great width, and where the greatest strength and protection are desired, I prefer to use the construction illustrated in Fig. 2, in which the top protective course is of hollow tiles similar to those composing the bottom course and having the similar dovetailed ribs $c$ and the air-spaces $b$. In this construction I embed in the concrete between the ribs $c$ of the upper course metal strips $g$, which are the replicas of and are embedded as nearly as possible on the same vertical planes as the metal strips $g$ of the lower course. Where T-iron strips are used, the lower ones will be inverted, as shown, the two thus constituting, in effect, small I-rods, though centrally separated by the intervening concrete, and where angle or channel irons are used they will be embedded so that the channels face each other.

As shown in Fig. 2, the end tiles of the lower courses are appropriately grooved to surround one half of the lower flanges of the I-beams A, thus protecting them from the warping, buckling, and twisting action of heat, and the end tiles of the upper courses may be similarly grooved to half surround the upper flanges of the I-beams, or, as shown, said upper courses may be entirely below said upper flanges, which are then protected by the usual layer of concrete or mortar placed over the completed structure and in which the usual wooden flooring-strips are embedded or upon which the tiling or mosaic of the flooring may be laid.

The method of practicing my invention is as follows: The usual wooden centering is erected, upon which are laid the rows or courses of hollow tiles constituting the lower courses with their ribs $c$ uppermost and the projecting lower edges of each course in contact with the tiles of the next course. As these tiles are laid dry and without mortar, unskilled labor may be used, thus reducing the cost. When the lower tiles are in position, the mortar or concrete $f$ in a semifluid state is poured into the conical spaces $e$ between the courses and upon the tiles between the ribs $c$ to about the top thereof, and when said concrete is beginning to set the transverse metal strips $g$ are forced into the mass to the desired position. Concrete is then added to the desired height and leveled off, or in the construction shown in Fig. 4 a top course of tiles is added. In the larger spans, as shown in Fig. 2, the upper metal strips $g$ are first forced into the mass, and the upper course of tiles is then laid.

It will be understood that the thickness of the arch will be proportioned to the width of the span, and while I have shown two metal strips for each lower course of tiles ordinarily but one such strip or but one pair, above and below, need be used.

Many modifications and changes may be made in the construction heretofore described without departing from the principle and scope of my invention, the gist of which consists in a flat arch formed of a combination of fire-clay and concrete, the latter being provided with transverse metal strips.

What I claim as new, and desire to secure by Letters Patent, is—

1. In fireproof construction, a flat arch composed of tiles or bricks having ribs, in combination with a superimposed mass of mortar or concrete filling the spaces between said ribs, and transverse metal strips embedded in said mass between the ribs of the tiles, substantially as described, and extended beyond the ribs.

2. A flat arch composed of tiles or bricks having upper projections or ribs whose sides converge to form dovetail spaces, in combination with a superimposed mass of mortar or concrete, and metal strips extended outward beyond the ribs and embedded in said mass in said dovetail spaces, substantially as described.

3. A flat arch composed of tiles or bricks having upper projections or ribs and lateral basal projections separating the sides of the tiles of adjoining courses, the outer faces of the tiles having dovetail slots $d$, in combination with a mass of mortar or concrete filling the spaces between the tiles and between the ribs thereof, and transverse metal strips embedded in said mass between the ribs of the tiles, substantially as described.

4. A flat arch composed of hollow tiles having upper longitudinal dovetailed ribs with longitudinal dovetail slots on their opposite outer faces and basal projections separating the sides of the tiles of adjoining courses, in combination with a mass of mortar or concrete filling the spaces between said tiles and between the ribs thereof, and transverse metal strips embedded in the mass between said ribs, substantially as described.

5. A flat arch composed of lower and upper courses of tiles or brick, in combination with a mass of mortar or concrete between such upper and lower courses and transverse metal strips embedded in said mass, substantially as described.

6. A flat arch composed of lower and upper courses of hollow tiles or brick, in combination with a mass of mortar or concrete between such upper and lower courses, and upper and lower transverse metal strips embedded in said mass in pairs, substantially as described.

7. A flat arch composed of lower and upper courses of hollow tiles or bricks, provided with oppositely-projecting ribs; in combination with a mass of mortar or concrete between such upper and lower courses, and transverse metal strips embedded in the mass between the ribs of the tiles of such upper and lower courses, substantially as described.

8. A flat arch composed of lower and upper courses of hollow tiles or brick, combined with a mass of mortar or concrete between such upper and lower courses, the adjacent faces of the upper and lower courses being formed with oppositely-disposed dovetailed spaces in which said mass is disposed.

9. A flat arch composed of lower and upper courses of hollow tiles or brick, combined with a mass of mortar or concrete between such upper and lower courses, the adjacent faces of the upper and lower courses being formed with oppositely-disposed dovetailed spaces in which said mass is disposed, and transverse metallic strips embedded in said mass.

Signed at New York, in the county of New York and State of New York, this 17th day of November, A. D. 1902.

GUSTAV LIEBAU.

Witnesses:
  WM. F. STONEBRIDGE,
  J. BRADLEY TANNER.